United States Patent
Bar et al.

(10) Patent No.: US 6,583,945 B1
(45) Date of Patent: Jun. 24, 2003

(54) METHOD FOR IRREVERSIBLY WRITE-SECURING A MAGNETIC STORAGE CARTRIDGE

(75) Inventors: Rafael Bar, San Diego; Daniel Alfonsi, Ramona, both of CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/183,874

(22) Filed: Oct. 30, 1998

(51) Int. Cl.[7] .............................................. G11B 19/04
(52) U.S. Cl. ...................... 360/60; 360/135; 360/133; 360/69; 369/14
(58) Field of Search .......................... 360/60, 135, 133, 360/77.03, 78.11, 69; 369/14; 386/94

(56) References Cited

U.S. PATENT DOCUMENTS

| | | |
|---|---|---|
| 3,263,218 A | 7/1966 | Anderson |
| 3,742,458 A | 6/1973 | Inoue et al. |
| 3,999,052 A | 12/1976 | Gooding et al. |
| 4,577,289 A | 3/1986 | Comerford et al. |
| 4,644,493 A | 2/1987 | Chandra et al. |
| 4,733,386 A | 3/1988 | Shimoi |
| 4,791,623 A | 12/1988 | Deiotte |
| 4,839,753 A | 6/1989 | Ide et al. |
| RE33,328 E | 9/1990 | Director |
| 4,975,870 A | 12/1990 | Knicely et al. |
| 5,042,023 A | 8/1991 | Yokota |
| 5,060,218 A | 10/1991 | Chiyomatsu |
| 5,097,445 A | 3/1992 | Yamauchi |
| 5,124,966 A | 6/1992 | Roth et al. |
| 5,142,676 A | 8/1992 | Fried et al. |
| 5,166,839 A | 11/1992 | Yu |
| 5,173,886 A | 12/1992 | Satoh et al. |
| 5,206,938 A | 4/1993 | Fujioka |
| 5,212,682 A | 5/1993 | Sakurai |
| 5,233,576 A | 8/1993 | Curtis et al. |
| 5,247,494 A | 9/1993 | Ohno et al. |
| 5,265,082 A | 11/1993 | Gniewek et al. |
| 5,265,230 A | 11/1993 | Saldanha et al. |
| 5,282,247 A | 1/1994 | McLean et al. |
| 5,287,229 A | 2/1994 | Saito et al. |
| 5,347,207 A | 9/1994 | Otsuki |
| 5,363,255 A | * 11/1994 | Ivers et al. ................ 369/14 X |
| 5,396,609 A | 3/1995 | Schmidt et al. |
| 5,422,871 A | 6/1995 | Nakashima et al. |
| 5,436,879 A | 7/1995 | Yamada |
| 5,446,857 A | 8/1995 | Russ |
| 5,471,424 A | 11/1995 | Takada et al. |
| 5,491,807 A | 2/1996 | Freeman et al. |
| 5,546,561 A | 8/1996 | Kynett et al. |
| 5,557,674 A | 9/1996 | Yeow |
| 5,559,647 A | 9/1996 | Kusano |
| 5,559,778 A | 9/1996 | Inokuchi et al. |
| 5,559,992 A | 9/1996 | Stutz et al. |
| 5,599,619 A | 2/1997 | Eckhardt et al. |
| 5,644,444 A | 7/1997 | Braithwaite et al. |
| 5,657,475 A | 8/1997 | Gillespie et al. |
| 5,666,515 A | 9/1997 | White et al. |
| 5,668,973 A | 9/1997 | Stutz et al. |

FOREIGN PATENT DOCUMENTS

EP   0473 301 A2   6/1991

* cited by examiner

*Primary Examiner*—Alan T. Faber
(74) *Attorney, Agent, or Firm*—Woodcock Washburn Kurtz Mackiewicz & Norris LLP

(57) ABSTRACT

A data cartridge and method for providing a write-securable storage medium that inhibits writing. The medium comprises a write-secure-type indicator in a predefined location that indicates the medium is of a type that is susceptible to write securing. Additionally, the medium comprises a write-secure-complete indicator in a predetermined zone of the disk that is not accessible to a user. When the write-secure-complete indicator is set by a host device, the setting is irreversible and consequently the data on the medium is protected, and additional writing onto any part of the medium is permanently prevented.

20 Claims, 6 Drawing Sheets

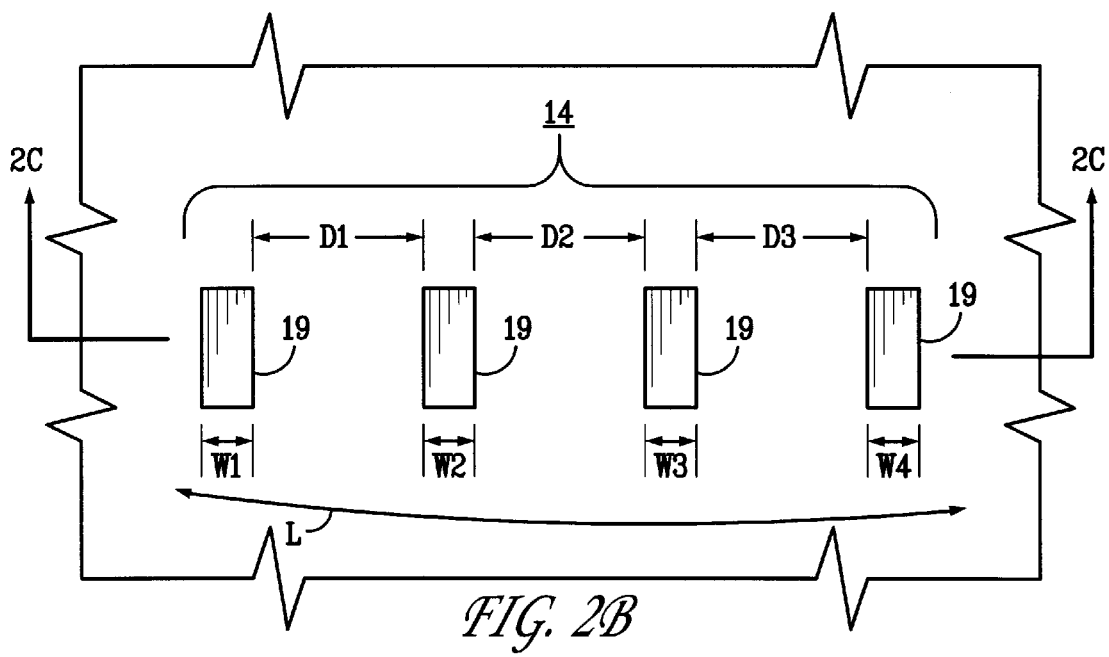
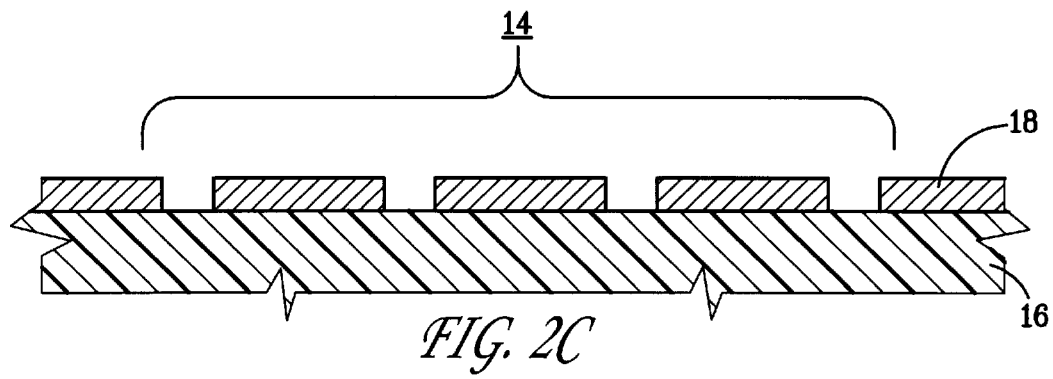

METHOD FOR IRREVERSIBLY WRITE-SECURING A MAGNETIC STORAGE CARTRIDGE

BACKGROUND OF THE INVENTION

1. Field of the Invention

This invention is directed to data storage devices, or disk drives, of the type that receive a removable disk cartridge. More specifically, the present invention is directed to a method for permanently write-protecting data on a data storage medium after the data has been transferred to the storage medium.

2. Brief Description of Prior Developments

Removable disk cartridges for storing digital electronic information typically comprise an outer casing or shell that houses a rotatable storage medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the read/write heads of the drive with access to the recording surfaces of the disk. A shutter or door mechanism is often provided to cover the opening when the cartridge is not in use to prevent dust or other contaminants from entering the cartridge and settling on the recording surface of the disk.

Presently, disk cartridges are provided with some form of write protection. For example, conventional 3.5" floppy disks have a mechanical slider mounted in a corner of the cartridge housing that can be moved from one position to another to indicate whether the floppy disk is, or is not, write-protected. An optical or mechanical switch in a floppy disk drive detects the position of the mechanical slider on the cartridge to determine whether the cartridge is write-protected. If so, the disk drive inhibits writing of information to the storage medium within the floppy disk cartridge. Unfortunately, the mechanical slider on the disk cartridge and the associated mechanical or optical switches in the disk drive increase the costs of the cartridge and drive. Moreover, there is no way to prevent a user from changing the write-protect status of the cartridge. All a user has to do is change the position of the mechanical slider, either intentionally or unintentionally, and valuable data may be destroyed.

Disk cartridges can also be read/write protected electronically as disclosed in U.S. Pat. No. 5,644,444 to Braithwaite et al. Braithwaite et al. discloses writing protection modes in predetermined locations on the storage medium that can be password protected. Nevertheless, the protection modes can still be changed, thus allowing for the opportunity of either unwanted or unauthorized changes to be made to the data on the disk.

Where it is desirable to prevent data contained on the cartridge from being altered, the above-described mechanisms fall short in that they allow the cartridge protection mode to change at will between protected and unprotected modes. Hence, even after write protecting a cartridge to prevent writing to a cartridge, a user desiring to alter the data must simply change the protection mode back to an unprotected mode.

Common VHS video cartridges provide a mechanism for permanently write protecting the video information that they bear via a mechanical write protect tab. By removing the tab, the video cartridge will not accept further recording. However, such mechanical solutions can be defeated. For example, video cartridges overwrite protection mechanism can be easily defeated by replacing the tab with tape or the like.

Thus, there is a need for an electronic overwrite protection method for the storage medium of a disk cartridge.

SUMMARY OF THE INVENTION

The present invention addresses the above need by providing method and apparatus for permanently providing electronic overwrite protection for a disk cartridge. The cartridge comprises a rotating storage medium that comprises tracks that are not accessible to a host device. The storage medium further comprises a write-secure-complete indicator that is located on a portion of the storage medium not accessible to the host device. A user of the host device that desires to protect the data contained on the storage medium commands a storage device containing the disk cartridge to set the write-secure-complete indicator. Thereafter, the storage device permanently set the write-secure-complete indicator.

Furthermore, the cartridge comprises a write-secure type media indicator that identifies the cartridge as being susceptible to write secure protection. According to an aspect of the invention, the storage device will only allow cartridges designated a write-secure type (via the indicator) to be permanently overwrite protected.

The write-secure type indicator comprises a predefined location of the storage medium. According to one embodiment, the write-secure type indicator comprises a predefined location on a track on the medium, preferably on a track not accessible by the host device. According to an alternative embodiment, the write secure indicator comprise an indelible mark that is formed in the magnetic coating of the medium.

DETAILED DESCRIPTION OF THE DRAWINGS

The foregoing summary, as well as the following detailed description of the preferred embodiments, are better understood when they are read in conjunction with the appended drawings. The drawings illustrate preferred embodiments of the invention to illustrate aspects of the invention. However, the invention should not be considered to be limited to the specific embodiments that are illustrated. In the drawings:

FIG. 2B is a more detailed view of the mark of FIG. 2A in accordance with the present invention;

FIG. 2C is a cross-sectional view taken along the line 2C—2C of FIG. 2B, and shows the mark ablated into the surface of the media of FIG. 2A;

FIG. 2D is a detailed view of an exemplary data structure containing write-secure-type disk information.

DETAILED DESCRIPTION OF PREFERRED EMBODIMENTS

The invention provides a method of permanently write-protecting magnetic data storage media after data has been transferred onto the storage media. Throughout the description, the invention is described in connection with a removable media disk drive. However, the particular disk drive and cartridge shown only illustrate the operation of the present invention and are not intended as limitations. Aspects of the invention are equally applicable to other disk drives including linear actuator disk drives, fixed medium drives, and removable medium disk drives as well as differently sized and shaped cartridges. Accordingly, the invention should not be limited to the particular drive or cartridge embodiment shown as the invention contemplates the application to other drive and cartridge types and configurations.

Figure 1:
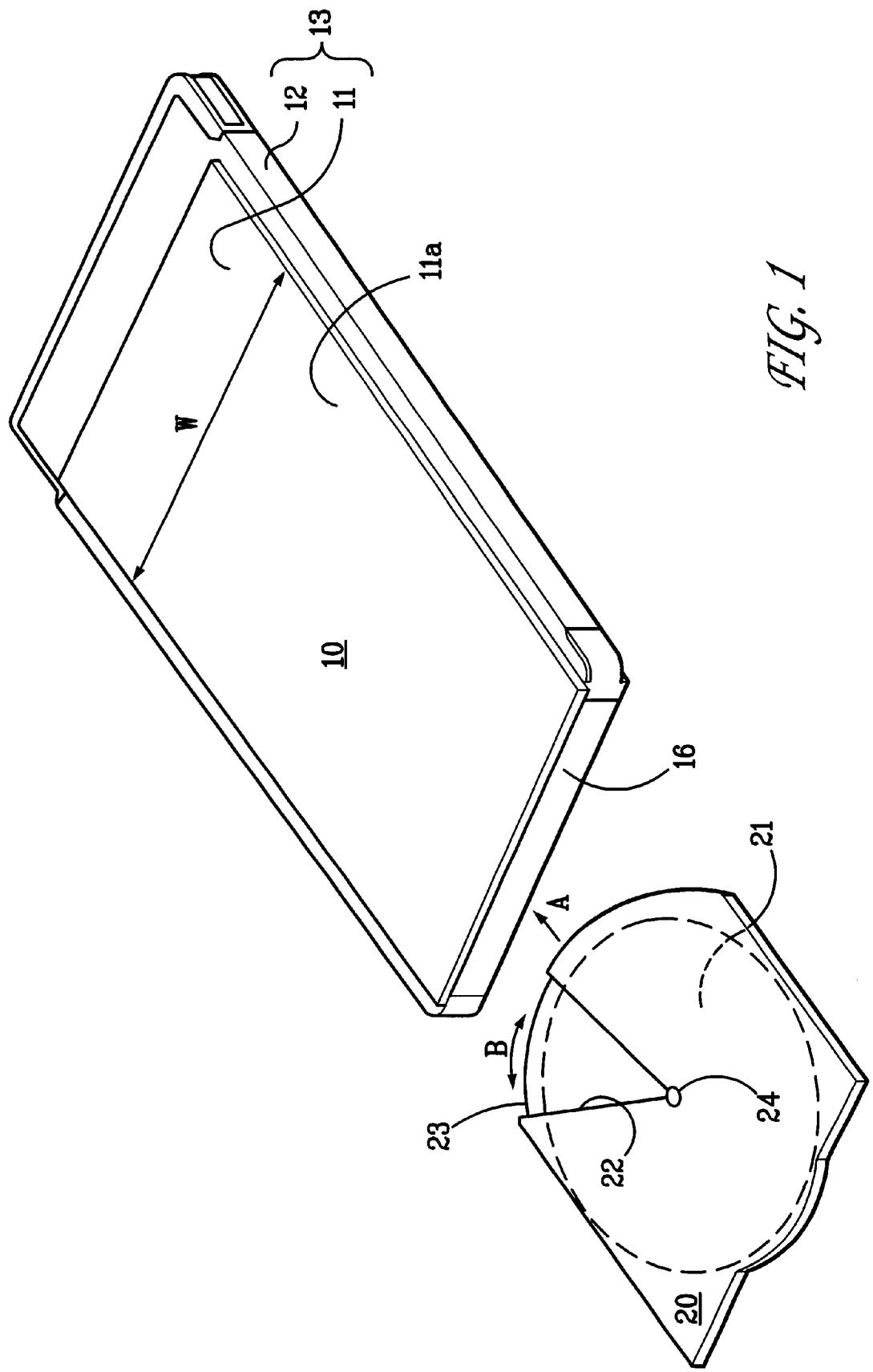
FIG. 1 is a perspective view of a data storage device, or disk drive, in which the present invention is embodied.

FIG. 1 is a perspective drawing of a disk drive device 10 and a disk cartridge 20. Drive 10 may be adapted for removable connection to a computer device or may be built-in to a computer device (not shown). Preferably, disk drive device 10 has a form factor such that it may be adapted for use with a PCMCIA connection (Type III or, more preferably, Type II). Disk drive device 10 may have a protective case such as protective case 13, consisting of an upper case 11 and a lower case 12, which form an interior space for accepting disk cartridge 20. Upper case 11 and lower case 12 are formed from sheet material. Lower case 12 has a bottom surface and side surfaces, and upper case 11 is formed so that it covers the top of lower case 12. Upper case 11 has a raised surface 11a, which projects upward across a width W of the upper case 11. Width W of this raised surface 11a is between about 48 mm and 51 mm. Accordingly, space is available within case 13 to accommodate a disk cartridge 20 as well as a disk drive mechanism and an electronics system.

A connector 15 (shown in phantom in FIG. 1) is provided in one end of protective case 13. As noted, the external dimensions of the protective case 13 are in a form which conforms to the PCMCIA standards, preferably Type II. According the standard, the form factor should conform to a length of about 85.6 mm, a width of about 54 mm, and a thickness of about 5 mm. By conforming to this standard, drive device 10 can be adapted for insertion into a PCMCIA port, such as the type commonly found in computers (not shown). Furthermore, when disk drive device 10 is inserted into a PCMCIA port of a computer or built-in to a computer device, connector 15 connects to a corresponding connector within the computer such that a power source and electrical signals can be transmitted and received between disk drive device 10 and the computer.

Disk cartridge 20 comprises an outer shell in which a flexible magnetic disk-shaped storage medium 21 is rotatably disposed. A disk access opening 22 is formed in a front portion of disk cartridge 20 to provide access to disk-shaped storage medium 21. A shutter 23 is rotatably disposed in cartridge 20 to selectively cover and expose disk access opening 22. Shutter 23 rotates in a circumferential direction (arrow B) with the center of rotation 24 proximate the center of disk-shaped storage medium 21. Disk cartridge 20 is inserted into disk drive device 10 through a disk opening 16 (arrow A). During insertion, shutter 23 is opened by a shutter opening and closing mechanism (not shown) exposing disk-shaped storage medium 21 for access by a pair of read/write heads, discussed in further detail below.

Figure 2A:
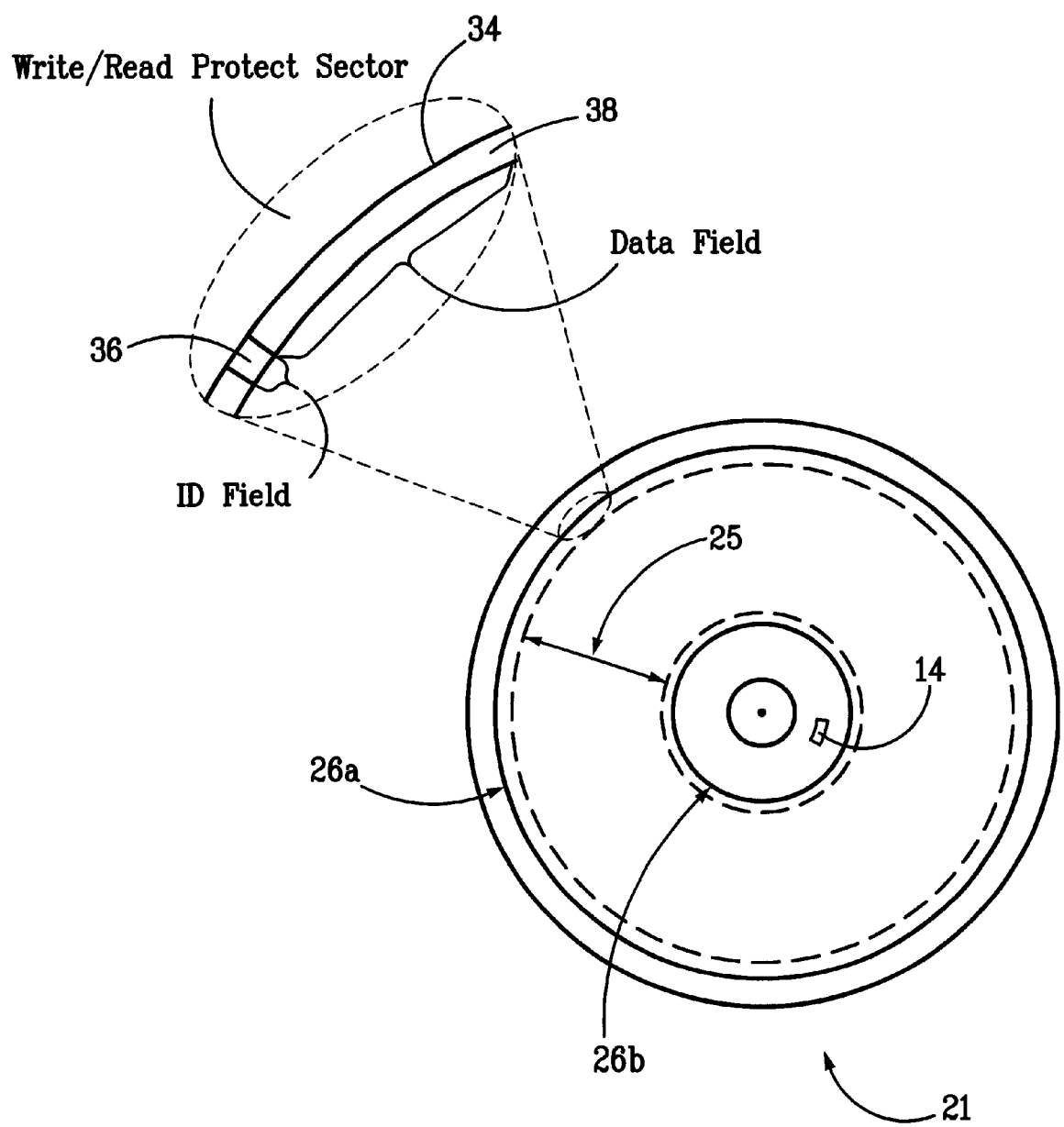
FIG. 2A shows a disk-shaped storage medium in accordance with a preferred embodiment of the present invention.

Referring now to FIG. 2A, disk-shaped storage medium 21 in accordance with the present invention is depicted. The storage medium 21 comprises a disk having a magnetic coating for writing and reading information to and from the storage medium 21. Preferably, information can be written on both sides of the storage medium 21. While magnetic media is preferred, other media can be employed, and the present invention is by no means limited to use of magnetic storage media. For example, the storage medium 21 can be a re-writeable optical storage medium or a magneto-optical storage medium.

In the preferred embodiment, the storage medium 21 has a band of approximately 1200 concentric data tracks 24 which can be written to, and read from, by a user's host computer device, such as a computer, a digital camera, or the like. Other track densities can be employed, however. In addition to the data tracks 24, there are at least two special information tracks 26a, 26b on each side of the storage medium (only one side shown in FIG. 2A), called z-tracks, that contain such information as the defect characteristics of that particular storage medium. The information contained on these tracks is identical and, in fact, is repeated in two separate locations on each track 26a, 26b. This redundancy is necessary to ensure that the information is always available, even if some areas of the storage medium become damaged and unreadable.

On each side of the storage medium 21, the z-tracks, i.e., track 26a, is located at the outside of the band of data tracks 25, and the other special information track 26b is located to the inside of the band of data tracks 25. None of the four special information tracks 26a, 26b can be accessed by a host computer device (not shown) to which the disk drive 10 is interfaced. Only the disk drive 10, and in particular, a microprocessor within the disk drive 10, can access the information written on these tracks 26a, 26b. Preferably, at least the outer special information track 26a on at least one side of the storage medium includes at least one special sector 34 that comprises an ID field 36 and a data field 38. The ID field 36 is used to identify special sector 34 and to distinguish that sector from other sectors in the z-track 26a. Preferably, the data field 38 comprises 128 bytes, however, in other embodiments, the data field 72 may comprise a different number of bytes.

Referring also to FIGS. 2B and 2C, in one embodiment of the present invention, a mark 14 is formed in the magnetic coating of the medium such that portions of the coating are absent or are indelibly altered. The mark 14 is read by the storage device 10 by detecting the absences of magnetic material of such portions 19 of the coating 18. Preferably, the mark 14 is created by ablating the portions 19 of the coating 18 from the substrate 16. Preferably, the indelible mark is of a type described in co-pending U.S. patent application Ser. No. 09/149,678, filed on Sep. 9, 1998, and entitled "READABLE INDELIBLE MARK ON STORAGE MEDIA," which is hereby incorporated by reference in its entirety.

The absent portions 19 of the coating 18 leave apertures 19 that extend along the surface of the medium 21 and that extend into the medium 21 from the surface toward a substrate 16. Preferably, such apertures 19 extend into the medium 21 and toward the substrate 16 to a depth sufficient to remove substantially all of the magnetic coating 18 from the floor of the aperture 20. Accordingly, the medium 21 in the region of each aperture 19 cannot magnetically store data. Removal of less than all of the magnetic coating 18 may also be performed if it can be shown that the remaining film 18 cannot magnetically store data in a manner sufficient to be magnetically read, and/or cannot be magnetically read due to spacing or other dimensional issues.

The apertures 19 of the mark 14 preferably extend in a generally circumferential direction with respect to the medium 21, as shown by the line L in FIG. 2B. Accordingly, with the read/write head of the drive 10 properly positioned, all of the apertures 19 may be rotated past such head in series. The apertures 19 may also be organized in other arrangements, such as extending both radially and circumferentially, without departing from the spirit and scope of the present invention. However, a series of apertures 19 extending radially cannot be rotated past a single drive head in series.

Referring to FIG. 2D, the data field 38 is shown in further detail. The data field 38 comprises an OS Boot byte 38A, a Password byte 38B followed by a gap of 50 bytes, a write-secure-type byte 38D, two protected mode bytes 38E followed by a thirteen byte gap, and a fifty byte pointer to an alternate write-secure-type indicate 38G. OS Boot Byte 38A provides an indication of the operating system type, e.g., "MACINTOSH," "WINDOWS/MS-DOS," or the like. Password byte 38B provides a password that is used when the status of the disk (i.e., write secured) can on only be changed with a password. Write-secure-type indicator byte 38D identifies whether or not the disk is a write-secure type. Write protect mode bytes 38E provides an indication of the current protection status of the cartridge, e.g., "Not-Protected," "Write-Secure-Complete," and so on.

Alternate write-secure indicator 38G provides for a second embodiment of providing a write-secure indicator. The present invention contemplates the use of one, or the other, or both indicators. That is, the medium can be identified as write-secure type by the one byte indicator 38D, by a pointer to an indicator 38G, or by the comparison of both indicators 38D, 38G. Alternate write secure indicator 38G provides a pointer to an address of a write-secure-type indicator. Preferably, the pointer points to mark 14, which is a write-secure-type indicator that is indelibly marked into the surface of the medium so that it cannot be altered, as describe in detail above.

However it is implemented, the write-secure-type indicator indicates the current protection capability of the storage medium 21, i.e., whether it susceptible to write-secure protection. This write-secure type indicator, byte 38D or pointed to by pointer 38G, defines a first predetermined location. The write-secure-type indicator will typically be factory preset when the cartridge is manufactured.

A second portion of the data field 38 of special sector 34 is used for writing a write-secure-complete indicator (protected mode bytes 38E) that, when initiated by a host device (i.e., handheld computer, digital camera, and the like), indicates that the current protection mode is write-secured and, as a result, disk drive 10 will never again permit writing to the disk cartridge. The second portion of special sector 34 defines another predetermined location.

Figure 3:
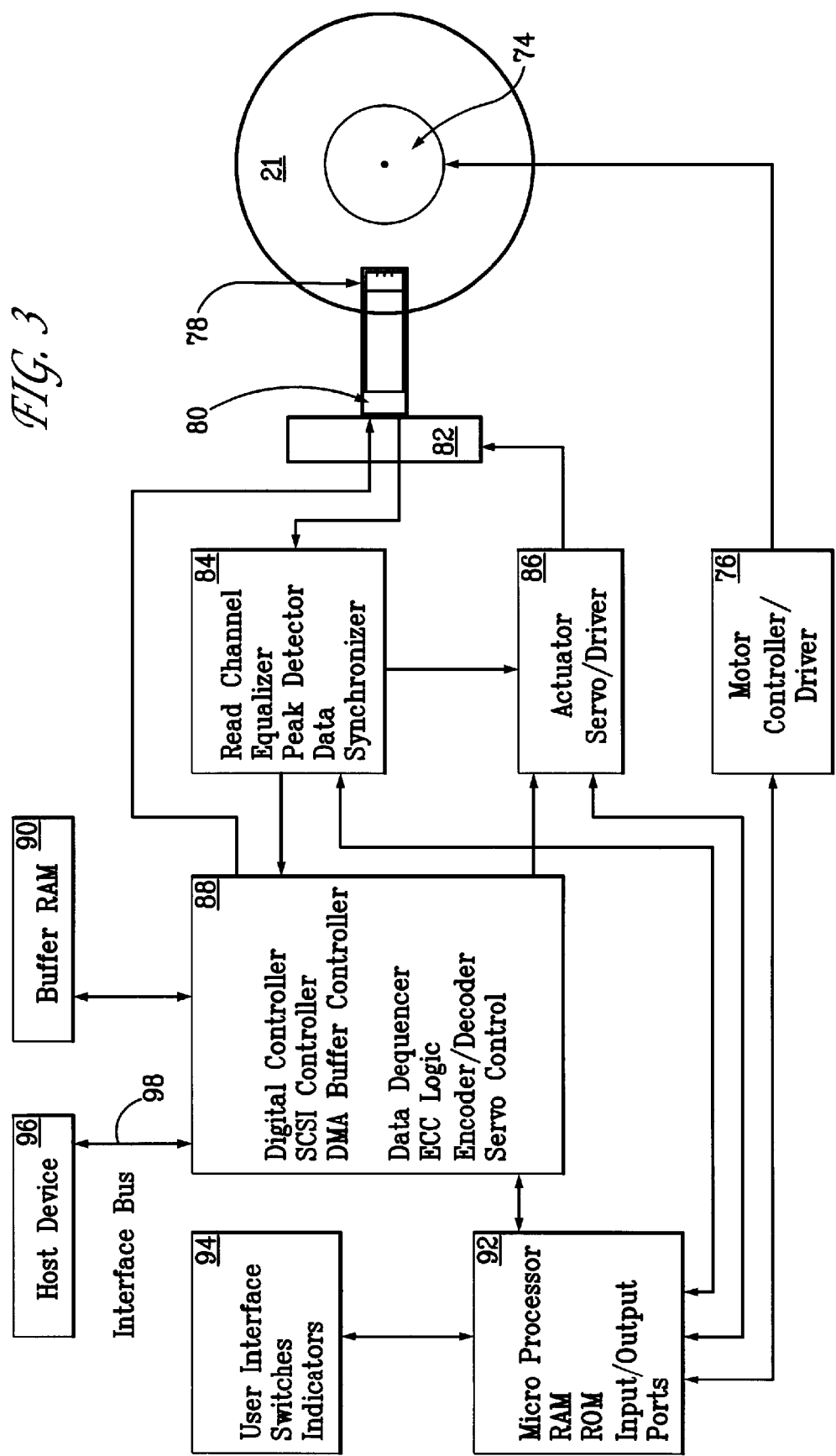
FIG. 3 is a block diagram illustrating further details of the disk drive of FIG. 1 in accordance with a preferred embodiment of the present invention.

FIG. 3 is a block diagram of the electronic components of an exemplary disk drive 10 in accordance with the present invention. As shown, disk drive 10 comprises a spindle motor 74, motor controller/driver 76, read/write heads 78, read/write pre-amp 80, read channel 84, actuator 82, actuator servo/driver 86, digital controller 88, random-access memory buffer 90, microprocessor 92 and user interface components 94. Disk drive 10 connects to a user's host device 96 through an interface bus 98.

The motor controller/driver 76 and spindle motor 74 rotate the storage medium 21 at a constant speed, allowing the read/write heads 78 to "fly" close to the rotating storage medium 21 for a stable recording environment.

The read/write pre-amp 80 amplifies the signals picked up by the heads 78 during read operations and switches current in the heads 78 during write operations. The read channel 84 shapes the pulses from the pre-amp, qualifies the peaks that represent the user data and special information, and generates a clock that is synchronous with the data coming off storage medium 21.

The actuator servo/driver 86 demodulates servo information recorded on storage medium 21 and compensates to position the read/write heads 78 precisely on a selected track of data storage medium 21.

The digital controller 88 decodes and error checks the data from the read channel 84 and stores the data temporarily in a buffer RAM. The controller 88 also makes sure that data is written to, or read from, the correct track and sector of storage medium 21. The controller 88, when directed by the microprocessor 92, sends data from the buffer 90 to the host device 96, or from the host device 96 to the buffer 90, in accordance with a predefined protocol such as ATAPI.

The microprocessor 92 controls and monitors all functions in the drive. The program code is stored in a Read-Only Memory ("ROM"), while a RAM is used for storing variables, flags, status information, etc. As described hereinafter in greater detail, the microprocessor 92 is responsible, in large part, for performing the steps of the method of the present invention. A significant function of the microprocessor 92 is to control access, i.e. reading and writing, to the storage medium 21 in accordance with the protection mode indicated by the code stored, or written, in the first predetermined location on the storage medium, i.e., the code written in bytes 38E of the data field 38. Any suitable microprocessor can be employed, such as, for example, a Motorola 68HC16 microprocessor or an Intel 8032 microprocessor.

According to the present invention, the write-secure protection mode of storage medium 21 can be initiated by a user of host device 96 at any time via software in the host device 96 to "set" the write-secure-complete indicator located in special information tracks 26a,26b. However, once the write-secure-complete indicator is set, the write-secure function is permanent with respect to the particular storage medium 21. Setting the protection mode of a storage medium in accordance with the present invention is achieved by sending an appropriate "protection mode command" from the host device 96 to the disk drive 10.

The present invention provides a method that permanently write protects a storage medium at the will of the user. Thus, for example, the user can add one piece of important data, i.e., photographic evidence in a police investigation, and then permanently secure the disk from further writing or the user may re-write over data many times until it is desired to write protect the disk. Preferably, the method would not require additional mechanical or electrical components, nor any physical interaction with the housing of a disk cartridge. After the data is permanently secured, the storage medium provides a high-level of integrity that the data has not been changed.

According to an aspect of the present invention, a manufacturing drive (not shown) writes a first indicator into either the inner z-tracks 26b or the outer z-tracks 26a, or both, herein referred to as write-secure-type indicator. The write-secure-type indicator is "set" by the manufacturing drive so that the cartridge is recognized by a user drive as having the functionality of being a write-secure disk when inserted into disk drive 10. Alternatively, as described above, the write-secure-type indicator is indelibly marked in the surface of storage medium 21, preferably by way of a laser.

Thereafter, the manufacturing drive writes a second indicator into either the inner guard band tracks 26b or the outer guard band tracks 26a, or both, herein referred to as write-secure-complete indicator. The write-secure-complete indicator is initially written as "cleared," or not "set." The write-secure-complete indicator can be a single bit, one or more bytes, or a string, indicative of the status of medium 21. Thereafter, the write-secure-complete indicator is "set" by a user at will by issuing a command through host software, as described above. Once the write-secure-complete indicator is "set," the drive 10 recognizes this and the medium 21 can no longer be written on regardless of the presence or absence of available space on the disk that otherwise would available for further writing.

The following table describes the drive behavior to the various settings of the write-secure-type indicator and the write-secure-complete indicator.

| Write-secure-type indicator | Write-secure-complete indicator | Description |
| --- | --- | --- |
| Cleared | Cleared | Normal disk - read/write allowed |
| Cleared | Set | Illegal combination |
| Set | Cleared | Tells the drive that this is a Write Secure Disk, and read and write is allowed |
| Set | Set | Tells the drive that all the data on the disk is protected from being overwritten. The data on the disk can be read. |

Figure 4:
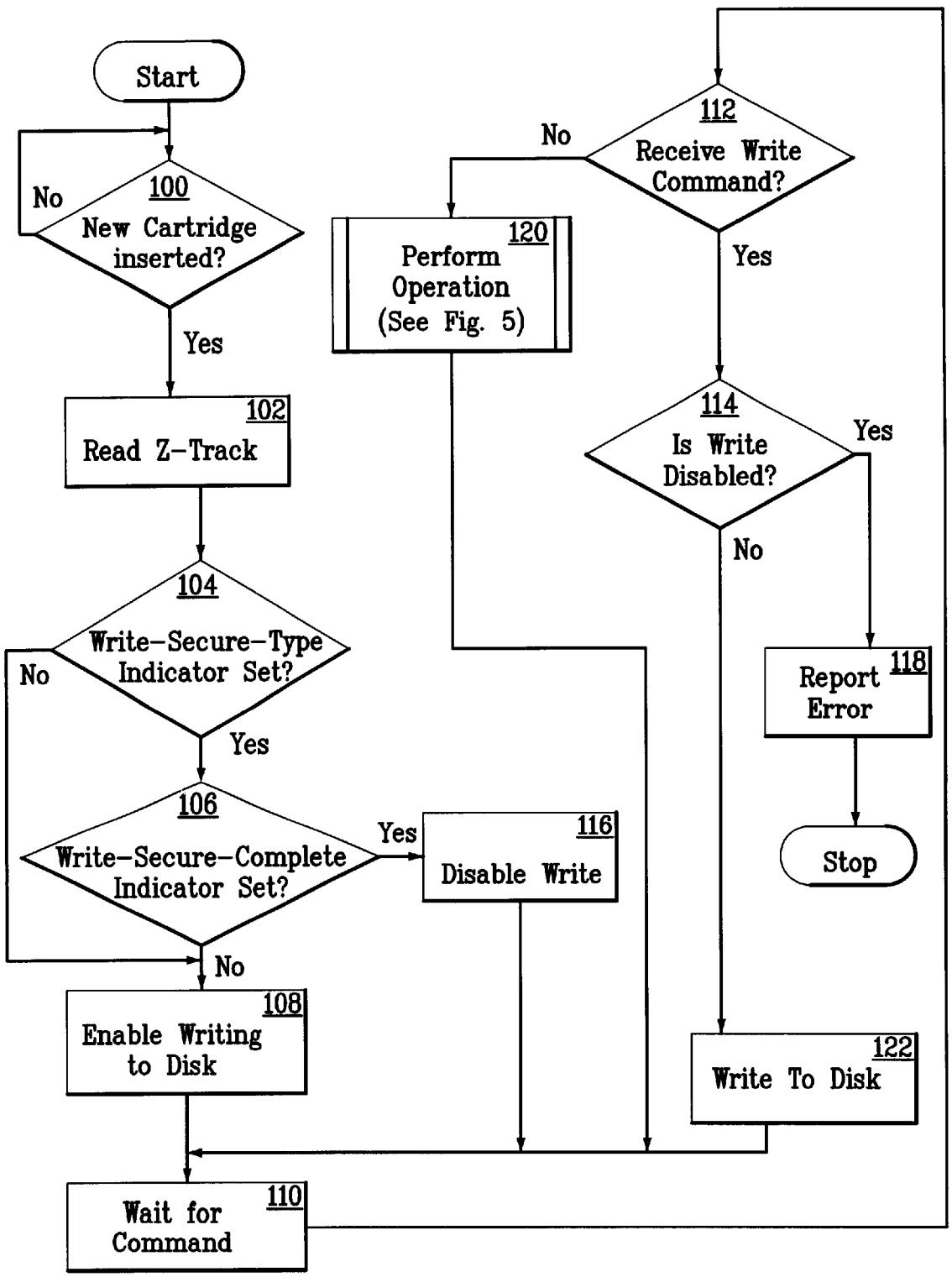
FIG. 4 is a flow diagram illustrating a preferred embodiment of a method of the present invention.
Figure 5:
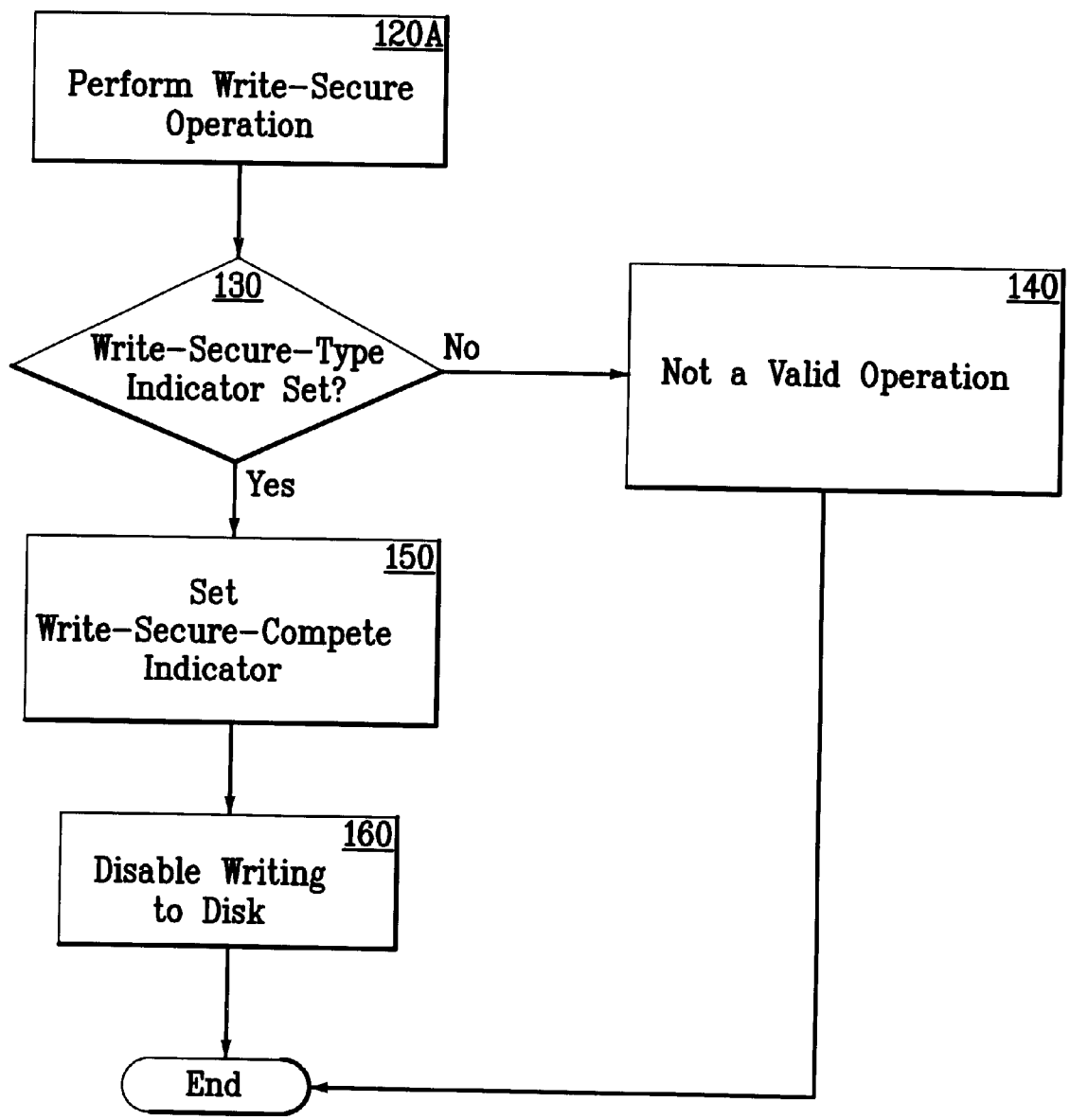
FIG. 5 is a flow diagram illustrating the preferred embodiment of the write-securing operation of the present invention.

An aspect of the operation of the present invention is illustrated in the flow charts of FIGS. 4 and 5. Referring now to FIG. 4, once cartridge 20 is introduced (step 100) into disk drive 10, disk drive 10 reads media control track 26a or 26b (the z-tracks)(step 102). Disk drive 10 detects the presence of the write-secure-type indicator (step 104) and identifies cartridge 20 as a write-secure-type. If no write-secure-type indicator is detected, the disk drive 10 will know that a write-secure cartridge 20 is not present and hence writing to the cartridge will be enabled (step 108). On the other hand, should disk drive 10 read disk 21 and identify cartridge 20 as a write-secure type and that the write-secure-complete indicator has been previously "set" (step 106) the disk drive 10 will recognize the disk as "read only" and all write functions will be disabled (step 116). Disk drive 10 will then wait for a command from the user (step 1 10). If the write-secure-type indicator is "set" and the write-secure-complete indicator has not been "set," disk drive 10 will enable writing to cartridge 20 (step 108).

At step 110, disk drive 10 waits for a command. The command can be one of many available disk drive commands. For example, if at this point the user wants to save data, i.e., write to cartridge 20, a command is issued and is received by disk drive 10 (step 112). At this point disk drive 10 confirms that cartridge 20 has not previously been write-secured (step 114). If the cartridge 20 has previously been write-secured, an error will occur (step 118). If the cartridge 20 has not previously been write secured, the command will be carried out (step 122). At step 112, if no write command is given by the host device, disk drive 10 will wait for another command to perform another operation, e.g., status or read.

FIG. 5 illustrates a command of particular importance: The command to set the cartridge 20 into write-secure mode. At the point where the user decides to protect the data on the cartridge 20, the command is given to write-secure cartridge 20 (step 120a). At this point, disk drive 10 will identify the write-secure-type indicator (step 130) and set the write-secure-complete indicator (step 150) thereby permanently disabling writes to cartridge 20.

The above method and apparatus describe embodiments for permanently write-securing a disk cartridge. Those skilled in the art will readily appreciate that many modifications to the invention are possible within the scope of the invention. Accordingly, the scope of the invention is not intended to be limited by the preferred embodiment described above but only by the appended claims.

What is claimed is:

1. In a system comprising a data storage device of the type that stores digital information on a data storage medium and a host device coupled to the data storage device for accessing the digital information, a method for permanently write-securing the data storage medium, comprising the steps of:

providing a write-secure-complete indicator in a predetermined location of the medium that is readable and writeable by the data storage device and not directly accessible to the host device;

writing data to the medium only when the write-secure-complete indicator indicates that the medium is not write secured; and setting the write-secure-complete indicator upon command from the host device to the storage device such that, once set, the write-secure complete indicator cannot be changed by the storage device or the host device.

2. The method of claim 1 wherein the medium further comprises a write-secure type indicator that is indicative of a medium susceptible to write-secure protection.

3. The method of claim 2 wherein the write-secure indicator is located in a predefined location on said medium that is not directly accessible by said host device.

4. The method of claim 3 wherein the write secure indicator comprises an indelible mark formed in a region of said medium that are indelibly altered.

5. The method of claim 4 wherein the method further comprises the steps of:

writing first data to the medium in the region of the indelible mark, the first data not being accepted where the portions of the region have been indelibly altered;

reading second data from the medium in the region of the indelible mark; and determining whether the second data is indicative of a write-secure type medium.

6. The method as recited in claim 5 further comprising the steps of:

rejecting commands to set the write-secure-type indicator when the second data is not indicative of a write-secure type medium.

7. The method of claim 1 further comprising the steps of:

upon a data write from the host device to the medium, determining the write-secure-complete status; and rejecting write commands when the write-secure-complete status is set.

8. The method of claim 7 further comprising the step of generating an error signal whenever access to the storage medium is attempted after said write-secure-complete indicator has been set.

9. The method of claim 1 wherein the storage media is a magnetic disk.

10. The method of claim 9 wherein the magnetic disk is flexible.

11. A computer-readable medium bearing program code for instructing a processor to carry out the steps recited in claim 1.

12. The computer readable medium as recited in claim 11 wherein said processor is part of said data storage device and wherein said computer-readable medium comprises a read only memory coupled to said processor.

13. A data storage cartridge comprising:
- a storage medium having a plurality of concentric tracks to and from which information is written and read;
- a write-secure-type indicator set to indicate that the storage medium is a write secure storage medium and that reading and writing onto the storage medium is allowed in a first predefined location thereon; and
- in a second predefined location on said storage medium, a write-secure-complete indicator that, when set by a user, indicates that the storage medium is now write-secure, said write-secure-complete indicator not being resettable.

14. The disk as described in 13 wherein said first predefined location of said write-secure-type indicator and said write-secure-complete indicator is in any area of the storage medium not directly accessible to a host device.

15. The data storage cartridge of claim 13 wherein said first predefined location is on a z-track.

16. The data storage cartridge of claim 13 wherein said write-secure-type indicator comprises an indelible mark on the surface of said storage medium.

17. The data storage cartridge of claim 13 wherein said storage medium comprises a magnetic storage medium.

18. The data storage cartridge of claim 17 wherein said magnetic storage medium comprises a flexible disk.

19. The data storage cartridge of claim 13 further comprising an outer shell, wherein said storage medium is rotatably disposed within said outer shell and providing read/write access to said storage medium.

20. A data storage cartridge comprising:
- a storage medium having a plurality of concentric tracks to and from which information is written and read;
- a write-secure-type indicator set to indicate that the storage medium is a write secure storage medium and that reading and writing onto the storage medium is allowed in a first predefined location thereon; and
- in a second predefined location on said storage medium, a write-secure-complete indicator that, when set by a user, indicates that the storage medium is now write-secure, said write-secure-complete indicator not being resettable;
- an outer shell, wherein said storage medium is rotatably disposed within said outer shell and providing read/write access to said storage medium; and
- a shutter rotatably disposed on said outer shell and providing read/write access to said storage medium.

* * * * *